(12) United States Patent
Xu et al.

(10) Patent No.: US 12,353,116 B2
(45) Date of Patent: Jul. 8, 2025

(54) MONITORING DEVICE

(71) Applicant: Shenzhen Oceanwing Smart Innovations Technology Co., Ltd, Shenzhen (CN)

(72) Inventors: Liangzhi Xu, Shenzhen (CN); Ziwen Chen, Shenzhen (CN); Xiaochu Zhong, Shenzhen (CN)

(73) Assignee: Shenzhen Oceanwing Smart Innovations Technology Co., Ltd, Shenzhen (CN)

( * ) Notice: Subject to any disclaimer, the term of this patent is extended or adjusted under 35 U.S.C. 154(b) by 325 days.

(21) Appl. No.: 18/159,121

(22) Filed: Jan. 25, 2023

(65) Prior Publication Data

US 2023/0236482 A1  Jul. 27, 2023

(30) Foreign Application Priority Data

Jan. 27, 2022  (CN) .......................... 202210101440.0

(51) Int. Cl.
| | |
|---|---|
| *G03B 17/56* | (2021.01) |
| *F16M 11/12* | (2006.01) |
| *F21V 33/00* | (2006.01) |
| *G03B 15/02* | (2021.01) |
| *H04N 7/18* | (2006.01) |
| *H04N 23/51* | (2023.01) |
| *H04N 23/56* | (2023.01) |

(Continued)

(52) U.S. Cl.
CPC .......... *G03B 17/561* (2013.01); *F16M 11/12* (2013.01); *G03B 15/02* (2013.01); *H04N 7/18* (2013.01); *H04N 23/51* (2023.01); *H04N 23/56* (2023.01); *H04N 23/695* (2023.01); *H04N 23/74* (2023.01); *F21V 33/0052* (2013.01)

(58) Field of Classification Search
CPC .............. G03B 17/56–58; G03B 15/02; H05B 47/125; H04N 23/56; H04N 23/50; H04N 23/51; H04N 23/695
See application file for complete search history.

(56) References Cited

U.S. PATENT DOCUMENTS 10,969,093 B1 *  4/2021  Hsu .................... F21V 23/0478
11,195,398 B1 * 12/2021  Fu .......................... G06V 20/52

FOREIGN PATENT DOCUMENTS

| CN | 103454768 A | 12/2013 |
|---|---|---|
| CN | 109724016 A | 5/2019 |
| CN | 209894175 U | 1/2020 |

(Continued)

OTHER PUBLICATIONS

May 5, 2023—(CN) First Office Action—App 202210101440.0.

(Continued)

*Primary Examiner* — Mariceli Santiago
(74) *Attorney, Agent, or Firm* — Banner & Witcoff, Ltd.

(57) ABSTRACT

A monitoring device may comprise: a base; a body rotatably connected to the base; a camera installed on the body; a lighting assembly rotatably connected to the body and having a first limit position and a second limit position on a path of rotation relative to the body. A light-emitting surface of the lighting assembly in the first limit position faces a shooting direction of the camera, and the light-emitting surface of the lighting assembly in the second limit position faces away from the shooting direction of the camera.

20 Claims, 9 Drawing Sheets

(51) Int. Cl.
*H04N 23/695* (2023.01)
*H04N 23/74* (2023.01)

(56) References Cited

FOREIGN PATENT DOCUMENTS

| | | | | | |
|---|---|---|---|---|---|
| CN | 213542186 | U | * | 6/2021 | |
| CN | 214281498 | U | * | 9/2021 | |
| CN | 113946084 | A | * | 1/2022 | |
| WO | WO-2022177600 | A1 | * | 8/2022 | ........... F16M 11/041 |

OTHER PUBLICATIONS

Mar. 29, 2024—(CN) Third Office Action app. No. 202210101440 w/ machine translation.
Nov. 30, 2023—(CN) Second Office Action app. No. 202210101440 w/ machine translation.

* cited by examiner

MONITORING DEVICE

CROSS-REFERENCE TO RELATED APPLICATION

The application claims priority to CN Application No. 202210101440.0, filed Jan. 27, 2022. The entire disclosure of the foregoing application is incorporated by reference in its entirety.

FIELD

The present disclosure relates to the technical field of security, in particular to a monitoring device.

BACKGROUND

Currently, many communities, buildings and industrial parks use a camera monitoring system in an area to improve security capability, so as to ensure security in the area. Meanwhile, in the case of insufficient ambient light, street lamps or wall lamps are installed in the communities, buildings, and industrial parks in order to improve visibility.

In general, street lamps, wall lamps, and/or cameras are installed in different locations (e.g., positions) in the area. For the maintenance and management of these facilities, a property staff needs to go to different locations, which is very inconvenient. Therefore, a monitoring device with a lighting function is used in some areas. For example, lighting lamps are arranged around a camera. However, in such a monitoring device, the lighting lamp is generally set in a fixed way, and a lighting angle thereof is fixed. Since the lighting angle of the lighting lamp is fixed and the camera can rotate, there is a lack of flexibility when the lighting lamp works with the camera.

SUMMARY

The present disclosure describes a monitoring device comprising: a base; a body rotatably connected to the base; a camera installed on the body; and a lighting assembly rotatably connected to the body and having a first limit position and a second limit position on a path of rotation relative to the body. A light-emitting surface of the lighting assembly in the first limit position may face a part of a shooting direction of the camera, and the light-emitting surface of the lighting assembly in the second limit position may face away from the shooting direction of the camera.

The body may comprise a first end face facing the lighting assembly, and the first end face may be provided with a limiter configured to limit the second limit position.

The limiter may comprise a swing rod assembly and a limiting groove, the swing rod assembly may be at least partially located in the limiting groove, one end of the swing rod assembly may be rotatably connected to the first end face, and the other end of the swing rod assembly may be rotatably connected to the lighting assembly.

The limiting groove may have a first side wall and a second side wall, and the swing rod assembly may swing between the first side wall and the second side wall. In the first limit position, a first gap may be formed between the swing rod assembly and the first side wall, and in the second limit position, a second gap may be between the swing rod assembly and the second side wall.

The limiting groove may be provided with a limit rotating shaft, one end of the swing rod assembly may be connected to the limit rotating shaft, and the other end may be connected to the lighting assembly. Alternatively, one end of the swing rod assembly may be sleeved on a rotating shaft, and the other end may be connected to the lighting assembly.

In some embodiments, one of the first end face and the lighting assembly may be provided with a rotating guide rail, and the other of the lighting assembly and the first end face may be provided with a positioning convex rib. The positioning convex rib may fit in the rotating guide rail, and the limiter may be located in the rotating guide rail.

The lighting assembly may be provided with a stop structure which is located at one end of the lighting assembly facing the first end face and may be disposed corresponding to the limiter to prevent the lighting assembly from moving.

The lighting assembly may comprise at least one lighting lamp, and each of which may be connected to one end face of the body. The lighting lamp may comprise a concave cambered surface part. A concave direction of the cambered surface part may be away from the camera, and the cambered surface part may be located on a side of the lighting lamp close to the camera to make a light path direction away from the camera. The lighting lamp may further comprise a plane part connected to the cambered surface part, and the plane part may be located on a side of the lighting lamp away from the camera.

The lighting lamp may comprise: a first lighting lamp connected to a first end face of the body; and a second lighting lamp connected to a second end face of the body. The first end face may face away from the second end face, and the camera may be located between the first lighting lamp and the second lighting lamp. A distance between the first lighting lamp and the camera may be smaller than a distance between the second lighting lamp and the camera.

A housing for shading may be provided around the camera, which may protrude outside a side where the camera is located by a preset height, and may have an opening at least configured to expose a lens of the camera. The housing may comprise a first side wall and a second side wall opposite to each other. The lens of the camera may be tilted toward the second side wall, and a preset height of the first side wall may be higher than that of the second side wall.

The body may be provided with a sealing ring, and the sealing ring and an inner wall of the body may be enclosed to form accommodating space.

The present disclosure describes a monitoring apparatus that comprises a base, and a body. The body may have a camera, and the body may be rotatably connected to the base for relative movement about a first axis. The monitoring apparatus may comprise a first lighting device and a second lighting device. The first and second lighting devices may be rotatably connected to the body for relative movement about a second axis substantially perpendicular to the first axis.

In order to solve the present technical problems, in the monitoring device provided by the disclosure, the body may be provided with a camera, and the body can rotate relative to the base, so that a shooting angle of the camera is increased and a monitoring range is increased. In addition, the lighting lamp can rotate relative to the body, and a lighting range thereof is large.

In addition, the body may be connected to the lighting assembly by plugging, which solves the problem of complicated assembly in a traditional technology. A waterproof wire passing mechanism may comprise a waterproof part, which can improve the waterproof performance of the monitoring camera device.

In addition, a concave cambered surface part may be provided on a side of the lighting lamp close to the camera to concentrate light emitted by the cambered surface part, which can prevent light from entering the camera to cause dazzling light or ghosting in an image shot by the camera.

BRIEF DESCRIPTION OF THE DRAWINGS

The following drawings of the disclosure are used as part of the disclosure to understand the disclosure. The drawings show embodiments of the disclosure and description thereof to explain devices and principles of the disclosure.

DETAILED DESCRIPTION

Figure 1:
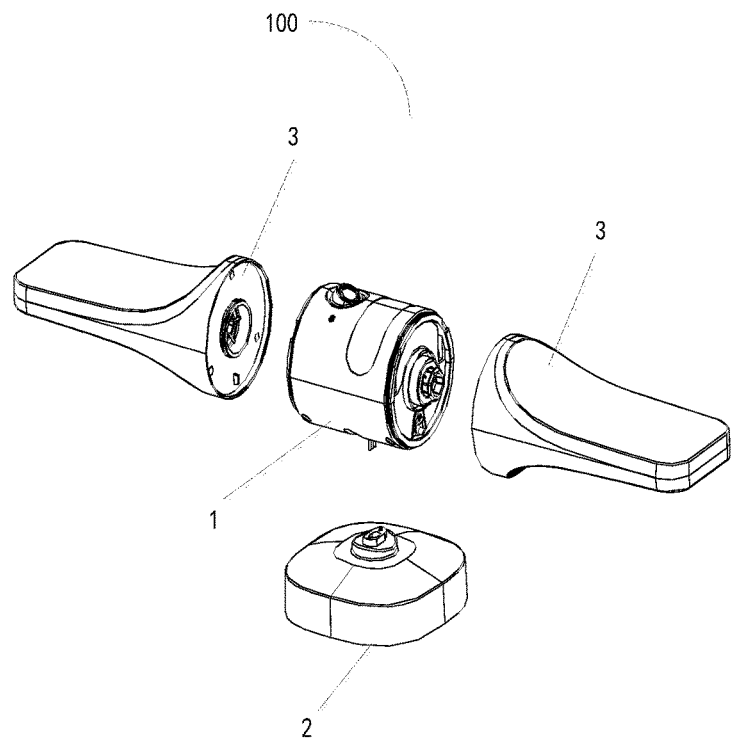
FIG. 1 shows an exploded schematic diagram of a monitoring device.
Figure 2A:
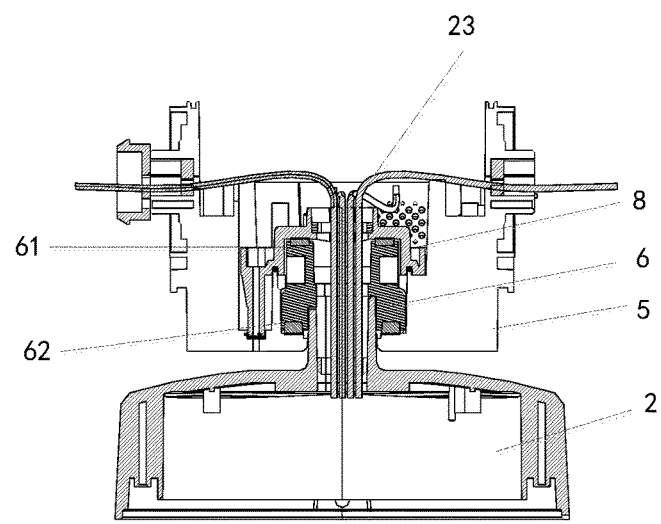
FIG. 2(a) shows a cross-sectional view of a body and a base of the monitoring device.
Figure 2B:
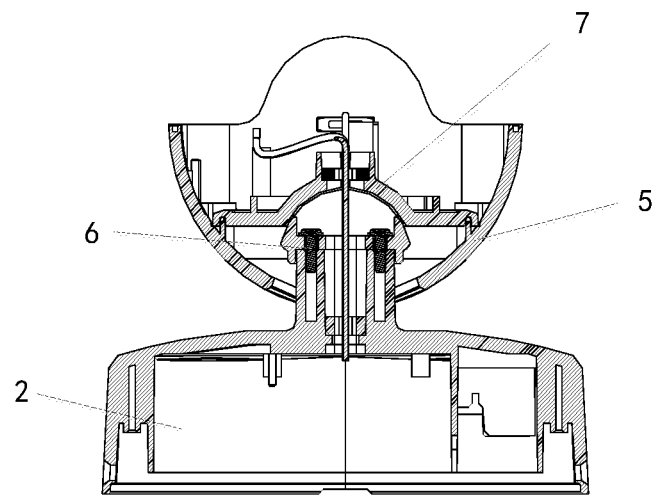
FIG. 2(b) shows a cross-sectional view of the body and the base of the monitoring device.
Figure 2C:
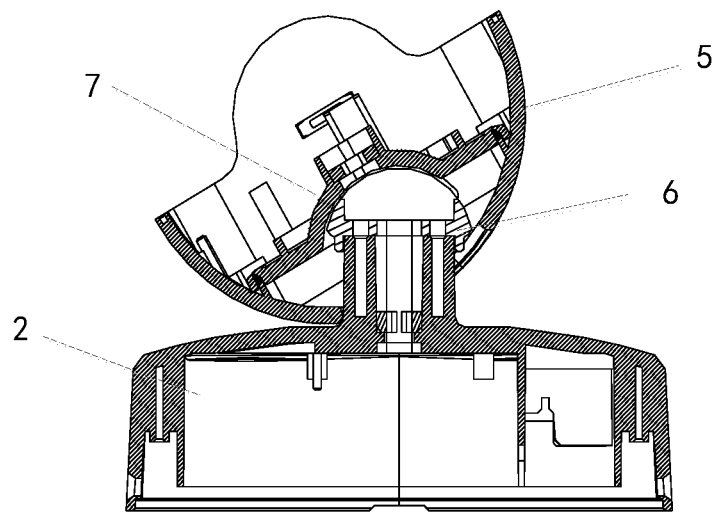
FIG. 2(c) shows a schematic diagram of the body of the monitoring device rotating right relative to the base.
Figure 2D:
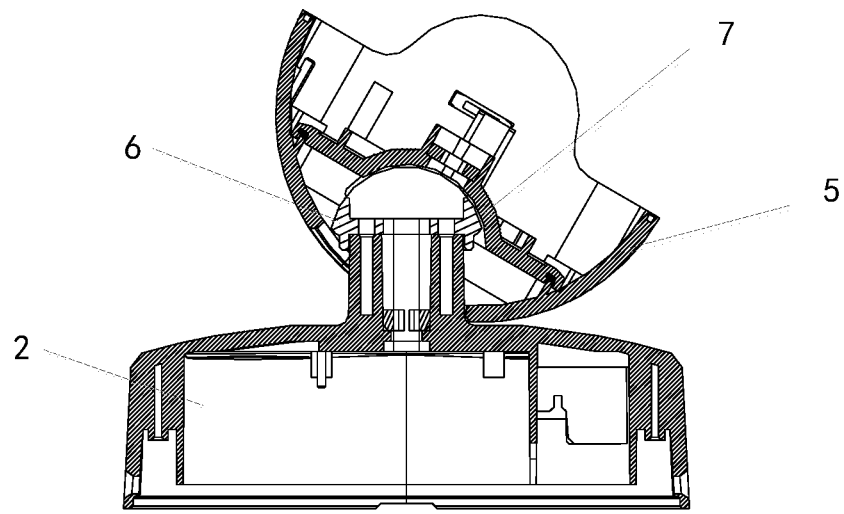
FIG. 2(d) shows a schematic diagram of the body of the monitoring device rotating left relative to the base.
Figure 3:
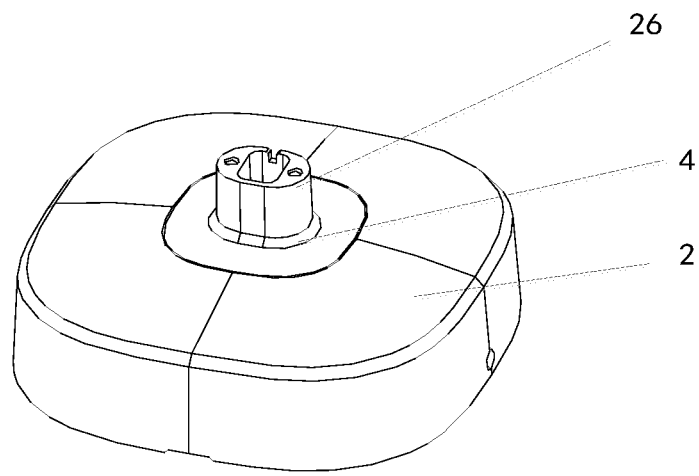
FIG. 3 shows a structural schematic diagram of the base of the monitoring device.
Figure 4:
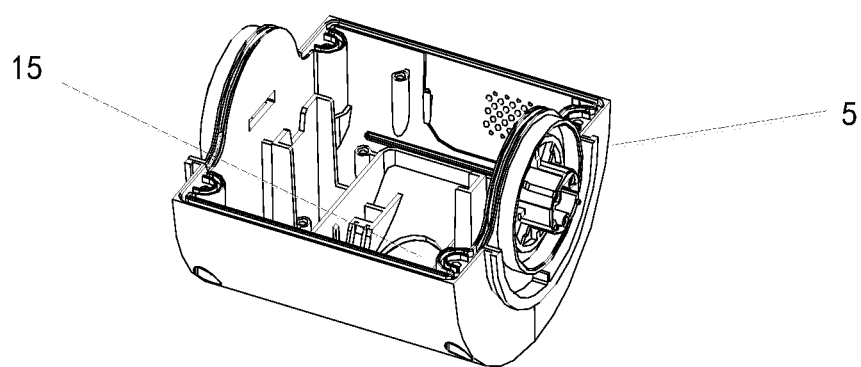
FIG. 4 shows a structural schematic diagram of a side of the monitoring device.

In the following description, numerous specific details are set forth in order to provide a more thorough understanding of the present disclosure. However, it is obvious to those skilled in the art that the present disclosure can be implemented without one or more of these details. In other examples, in order to avoid confusion with the present disclosure, some technical features known in the art are not described.

It should be understood that the present disclosure can be implemented in different forms and should not be construed as limited to embodiments or examples set forth here. In the drawings, dimensions and relative dimensions of layers and regions may be exaggerated for clarity. The same reference numeral indicates the same element throughout the specification.

It should be understood that although the terms first, second, third, etc. can be used to describe various elements, components, areas, layers and/or parts, these elements, components, areas, layers and/or parts should not be limited by these terms. These terms are only used to distinguish one element, component, area, layer or part from another element, component, area, layer or part. Therefore, without departing from teaching of the present disclosure, a first element, component, area, layer or part to be discussed below can be represented as a second element, component, area, layer or part.

Spatial relationship terms such as "below", "under", "lower", "underneath", "above", "upper" and the like can be used here for convenience of description to describe a relationship between one element or feature and other elements or features shown in the drawings. It should be understood that in addition to orientations shown in the drawings, the spatial relationship terms are intended to include different orientations of devices in use and operation.

The terms used here are only for the purpose of describing specific embodiments and are not taken as a limitation of the present disclosure. As used herein, singular forms of "a," "an" and "the" are also intended to include plural forms, unless the context clearly indicates otherwise. It should also be understood that the terms "comprise" and/or "comprising" when used in the specification determine the presence of features, integers, steps, operations, elements and/or components, but do not exclude the presence or addition of one or more of other features, integers, steps, operations, elements, components and/or groups. As used herein, the term "and/or" includes any and all combinations of related listed items.

Embodiments of the disclosure may be described herein with reference to a cross-sectional view which is a schematic diagram of the present disclosure. In this way, changes from the shown shape due to, for example, manufacturing techniques and/or tolerances can be expected. Therefore, the embodiments of the present disclosure should not be limited to specific shapes of areas shown here, but include shape deviations due to, for example, manufacturing. Therefore, the areas shown in the drawings are schematic in nature, and shapes thereof are not intended to show actual shapes of the areas of the device and are not intended to limit the scope of the present disclosure.

In order to solve the foregoing problems, the present disclosure describes a monitoring device that comprises: a base; a body rotatably connected to the base and being rotatable with respect to a direction perpendicular to an installation direction of the monitoring device; a camera installed on the body; a lighting device (e.g., a lighting assembly) rotatably connected to the body and having a first limit position and a second limit position on a path of rotation relative to the body. A light-emitting surface of the lighting device in the first limit position may face a shooting direction of the camera, and the light-emitting surface of the lighting device in the second limit position may face away from the shooting direction of the camera. The body of the monitoring device may be provided with a camera, and the body can rotate relative to the base, so that a shooting angle of the camera is increased and a monitoring range is increased. In addition, the lighting device can rotate relative to the body, and a lighting range thereof is large. The body may be connected to the lighting device by plugging, which solves the problem of complicated assembly in a traditional technology. A waterproof wire passing mechanism may comprise a waterproof part, which can improve waterproof performance of the monitoring camera device. In addition, a concave cambered surface part is provided on a side of the lighting device close to the camera to concentrate light emitted by the cambered surface part, which can prevent light from entering the camera to cause dazzling light or ghosting in an image or video captured or shot by the camera.

The monitoring device will be described in detail below with reference to FIGS. 1 and 2(a)-2(d). FIG. 1 shows an exploded schematic diagram of a monitoring device 100 (e.g., a monitoring apparatus, a monitoring system). FIGS. 2(a)-2(d) show schematic diagrams of assembly of the body and the base and schematic diagrams of the rotation of the body relative to the base.

Figure 5:
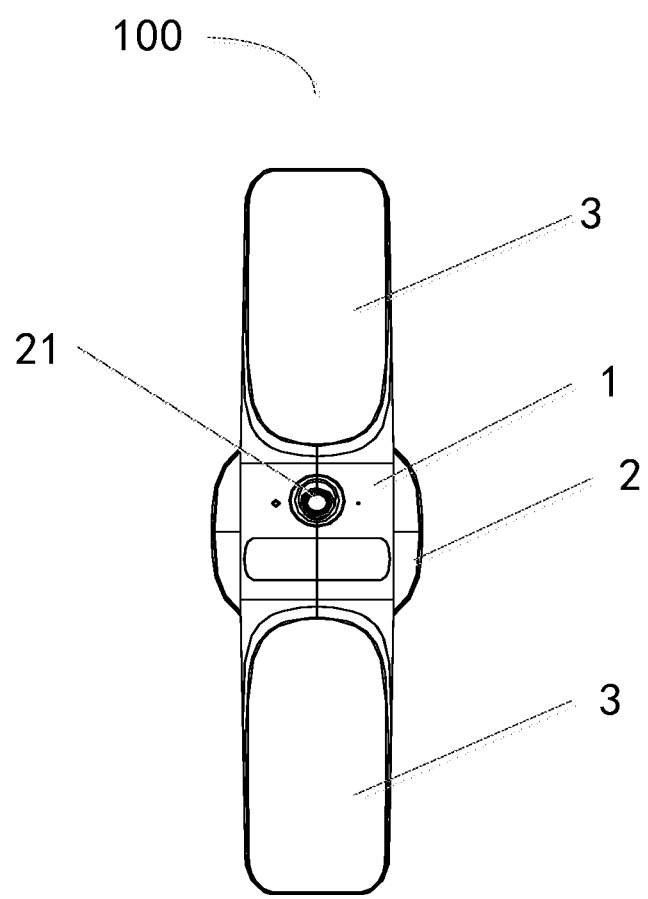
FIG. 5 shows a front view of the monitoring device.

The monitoring device 100 may comprise a body 1 and a base 2 which are rotatably connected to each other, and the body 1 can rotate relative to an installation direction of the monitoring device 100. The installation direction of the monitoring device 100 may be determined according to a direction of a connecting line formed between a middle position of a lighting assembly 3 (e.g., one or more lighting devices, one or more lighting lamps) and a middle position of the body 1. For example, the monitoring device 100 may be installed on a vertical wall surface, and the direction of the line formed between a middle position of the lighting assembly 3 and a middle position of the body 1 may be parallel to a vertical plane (e.g., as shown in FIG. 5). When a vertical direction is the installation direction, the body 1 can rotate in the horizontal direction which is perpendicular to the installation direction of the monitoring device 100. If the monitoring device 100 is installed in the horizontal direction, (e.g., when the connecting line between the middle position of the lighting assembly 3 and the middle position of the body 1 lies in the horizontal direction), the body 1 can rotate in the vertical direction. It can be understood that since the middle position and the middle position of the body 1 may be only approximate positions, the connecting line between the middle position and the middle position of the body 1 may deviate from the vertical direction or the horizontal direction by a certain angle, and correspondingly, a rotation direction of the body 1 may deviate from the horizontal direction or the vertical direction by a certain angle. The lighting assembly 3 may be rotatably connected to the body 1, and a rotation direction of the lighting assembly 3 can be the same as the body 1 and/or perpendicular to the rotation direction of the body 1. The lighting assembly 3 can automatically rotate according to a user's position, and the rotation of the lighting assembly 3 may be controlled by a control part disposed in the body 1. The lighting assembly 3 may have a first limit position and a second limit position on a path of rotation of the camera relative to the body 1. The first limit position may correspond to an extreme position of clockwise rotation, and the second limit position may correspond to an extreme position of counterclockwise rotation. In an example, the lighting assembly 3 may rotate between the first limit position and the second limit position. A light-emitting surface of the lighting assembly 3 in the first limit position may face at least a part of a shooting direction of the camera 21. The shooting direction of the camera 21 may refer to a shooting angle range of the camera 21, and the light-emitting surface may face a position within the shooting angle range of the camera 21, so as to light the environment where the monitoring device 100 is located. The light-emitting surface of the lighting assembly 3 in the second limit position may face away from the shooting direction of the camera 21, and the lighting assembly 3 might not light the environment where the monitoring device 100 is located.

The camera 21 may be installed on the body 1 which has a side 5 and a first end face, wherein the first end face may be configured to install the lighting assembly 3, and the camera 21 may be installed on the side 5, so that the camera 21 and the lighting assembly 3 may be staggered, which can prevent light of the lighting assembly 3 from affecting the image and/or video acquisition of the camera 21 to a certain extent and can improve the quality of the images and/or videos captured by the camera 21. In addition, this arrangement of the camera 21 and the lighting assembly 3 can integrate the camera 21 with the lighting assembly 3 into one device, and can not only light the environment where the monitoring device 100 is located, but can also take videos at night. The lighting assembly 3 may further comprise a sensor configured to control turning on or off of the lighting assembly 3, and the sensor may be an infrared sensor or a radar sensor. Since the body 1 can rotate relative to the base 2 and the lighting assembly 3 can rotate relative to the body 1, the monitoring device 100 may have an adjustable shooting angle and an adjustable lighting angle, which can be applied to very open areas outdoors and indoor environments and has high environmental applicability. Meanwhile, the presence of the first limit position and the second limit position also enables a user to selectively use the lighting assembly 3, and the lighting assembly 3 can be rotated to the second limit position when the lighting assembly 3 is not needed.

The body 1 may have a first end face (e.g., side) facing the lighting assembly 3, and the first end face may be provided with a limiter (e.g., a stopper, a device) configured to limit (e.g., define) the first limit position and/or the second limit position. The limiter may have various structures. For example, a protrusion may be directly disposed on the first end face, and a stop structure may be disposed at an end of the lighting assembly 3 facing the first end face, and the stop structure may correspond to a position of the protrusion, so that in the process of rotation, the protrusion can limit further rotation of the stop structure. Both the protrusion and the stop structure may be located on a rotation path of the lighting assembly 3. For example, one of the first end face and the lighting assembly 3 may be provided with a rotating guide rail, and the other of the lighting assembly 3 and the first end face may be provided with a positioning convex rib which fits in the rotating guide rail, and the limiter may be located in the rotating guide rail.

As another example, the limiter can be a movable swing rod assembly 24. With regard to the moving properties of the swing rod assembly 24, a limiting groove may be formed on the first end face, and the swing rod assembly 24 may be at least partially located in the limiting groove, so that a swing range of the swing rod assembly 24 may be limited by the limiting groove. Since the swing rod assembly 24 may have a certain width, a swing of the swing rod assembly 24 in the limiting groove may make the rotation angle of the lighting assembly 3 from the first limit position to the second limit position adjustable according to the rotation range of the swinging rod assembly 24 in the limiting groove, so that the lighting assembly 3 can rotate 360 degrees without being limited by a width of the swing rod assembly 24 itself. A swing direction of the swing rod assembly 24 may be the same as a rotation direction of the lighting assembly 3.

The limiting groove may have a first side wall and a second side wall, and the swing rod assembly 24 may swing between the first side wall and the second side wall. In the first limit position, there may be a gap between the swing rod assembly 24 and the first side wall, and in the second limit position, there may be a gap between the swing rod assembly 24 and the second side wall, so that a swingable range of the swing rod assembly 24 may be limited.

The swing rod assembly 24 can be directly and rotatably connected in the limiting groove, and the limiting groove may be provided with a limit rotating shaft, one end of the swing rod assembly 24 may be connected to the limit rotating shaft, and the other end is connected to the lighting assembly 3. Alternatively, one end of the swing rod assembly 24 may be connected to a rotating shaft, and the other end may be connected to the lighting assembly 3. In another example, one end of the swing rod assembly 24 may be sleeved on the rotating shaft, and the other end may be connected to the lighting assembly 3.

The side 5 of the body 1 may be provided with an opening, and a limit connecting assembly 6 may be located above the opening, a connecting part 26 provided on the base 2 may be connected to the connecting assembly, and the opening may provide space for the connecting part to connect the limit connecting assembly. There may be other connection ways. For example, a connecting part may be provided on the limit connecting assembly 6, then the connecting part may extend into accommodating space of the base 2, then the limit connecting assembly may be fixedly connected to the accommodating space of the base 2 by, for example, screws, and the connecting part may pass through the opening, so that the side can rotate within an opening range.

Figure 12A:
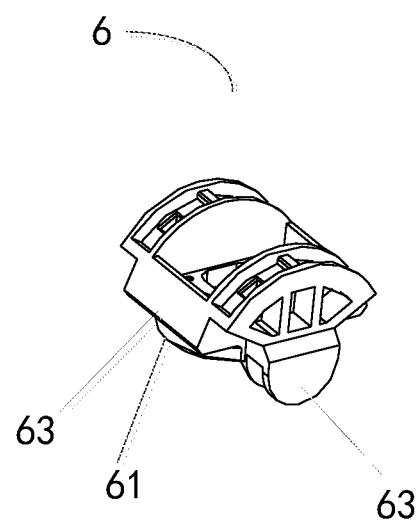
FIG. 12(a) shows a structural schematic diagram of a limit connecting assembly.
Figure 12B:
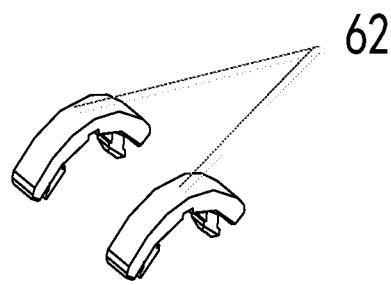
FIG. 12(b) shows a structural schematic diagram of a first damping block.
Figure 12C:
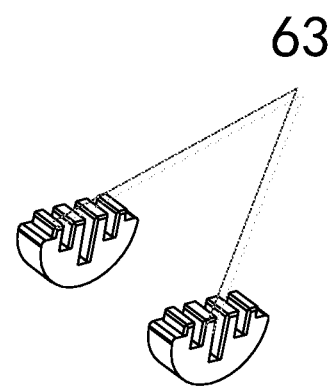
FIG. 12(c) shows a structural schematic diagram of a second damping block.

In an example, as shown in FIGS. 12(*a*) to 12(*c*), the limit connecting assembly 6 may comprise a limit connecting piece 61 and a first arc part. In this example, the body 1 may be provided with an arc groove to accommodate the first arc part, which ensures that the first arc part can rotate relative to the body 1 and that the body 1 rotates with respect to a direction perpendicular to the installation direction of the monitoring device 100. A rotation center axis of the first arc part and a rotation center axis of the body 1 can be set in parallel or coaxially. A damping block 62 may be disposed between the body 1 and the limit connecting assembly 6 to increase friction between the limit connecting assembly 6 and the side 5 and facilitate relative movement between the limit connecting assembly 6 and the side 5. Specifically, the first damping block 62 can be fixedly connected to the limit connecting assembly 6 by clamping, gluing, or the like.

An end of the limit connecting assembly 6 opposite to the first arc part may be provided with a second cambered surface part, and corresponding to the second cambered surface part. An arc groove may be also provided to further accommodate the second cambered surface.

The limit connecting assembly 6 may further comprise a limit fixing cover 7, the top of which may be provided with an arc groove, and the second cambered surface part may fit in the arc groove at the top of the limit fixing cover 7, so that the two may rotate relatively.

A waterproof sealing ring may be disposed on a side of the limit connecting assembly 6 facing the base 2, and a waterproof sealing ring may also be disposed on a side of the limit fixing cover 7 facing the limit connecting assembly 6. After the limit fixing cover 7 is assembled with the limit connecting assembly 6 and the body, the waterproof sealing ring between the limit fixing cover 7 and the limit connecting assembly 6 may be pressed, the waterproof sealing ring may be formed between the connecting assembly 6 and the body 1, and the two waterproof sealing rings and an inner wall of the body 1 may be enclosed to seal a part of the body 1 which avoids space where the limit connecting assembly 6 is located, so that the part of accommodation space is kept dry and a circuit therein is prevented from being damaged. The circuit may comprise a power supply circuit of the camera, a power supply circuit of the lighting lamp, a controller circuit and the like.

The side 5 may be rotated a preset angle along one side of the opening facing away from the installation direction. For example, if one side of the opening is L and an angle at which the side 5 can rotate is $\varphi$, a length of one side of the opening can be calculated according to the formula $\varphi = 180/\pi \times L$. In practice, a size of one side of the opening can be determined based on the rotation angle according to the actual needs.

In an example, the base 2 may further comprise a waterproof rubber ring 8 and the limit fixing cover 7. The waterproof rubber ring 8 may be disposed in a waterproof rubber groove of the limit fixing cover 7. The limit fixing cover 7 may cover the limit connecting assembly 6. The limit connecting assembly 6 may further comprise a second damping block 63 which may be disposed on a second side of the limit connecting piece 61 and may contact with the limit fixing cover 7.

The limit fixing cover 7 can shield the limit connecting assembly 6 to make it look neat and beautiful. Moreover, the waterproof rubber ring 8 on the limit fixing cover 7 can improve the waterproof performance of a joint between the base 2 and the body 1, and the limit fixing cover 7 can protect the waterproof rubber ring 8 and other parts from falling off easily. The waterproof rubber ring 8 may comprise a waterproof silica gel ring.

With reference to FIG. 2(*a*) and FIG. 2(*d*), the base 2 may be provided with a wire passing hole, which can be disposed at the bottom of the first limiting groove 4. Correspondingly, the limit fixing cover 7 can be provided with a wire passing hole or certain space for a wire 23 to extend out. The wire 23 can sequentially pass through wire passing holes of the body 1 and the lighting assembly 3, then pass through the opening of the body 1 to the base, 2 and then extend out of the base 2. The wire 23 may comprise one or more of a power line, a network line and a data line, or other lines for connecting the monitoring device.

Figure 6:
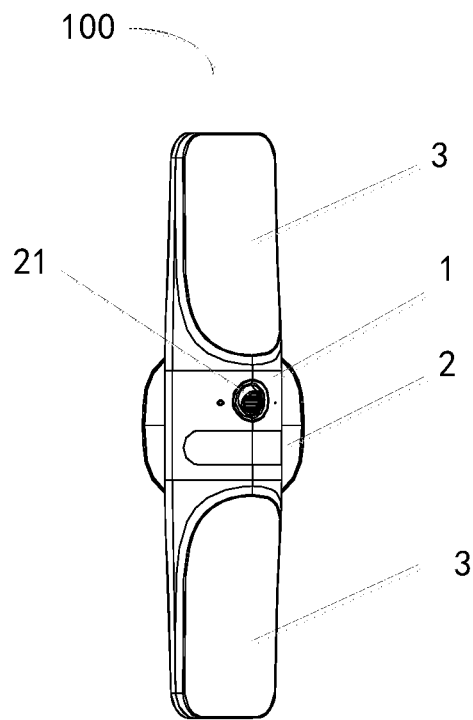
FIG. 6 shows a schematic diagram of an angle of the monitoring device.
Figure 7:
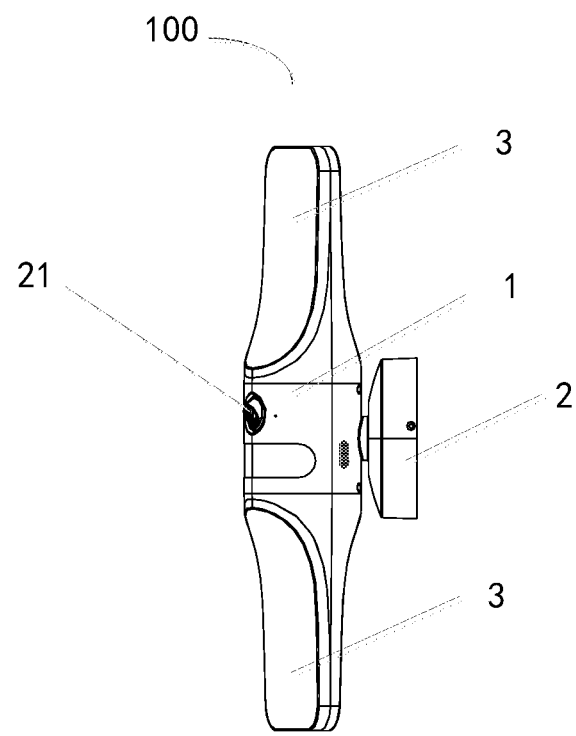
FIG. 7 shows a schematic diagram of an angle of the monitoring device.

With reference to FIGS. 5 to 7, a rotation process of the monitoring device will be described below. FIG. 5 shows a front view of the monitoring device 100. As can be seen from FIG. 5, in the monitoring device 100, the body 1 may be connected to the base 2. When the body 1 and the base 2 rotate relatively, since the lighting assembly 3 is connected to the body 1, the body 1 may drive the lighting assembly 3 to rotate together (e.g., the body 1 and the lighting assembly 3 rotate synchronously). In an example, the body 1 may be a cylinder with a camera 21 on its side, and the lighting assembly 3 may be one or more lighting lamps 16. The camera 21 and the lighting lamp(s) 16 may rotate synchronously. The lighting lamp(s) 16 may cooperate with the camera 21 to make the camera 21 have a better shooting effect in the case of sufficient light. FIG. 6 shows a schematic diagram of an angle of the monitoring device 100 rotating right. FIG. 7 shows a schematic diagram of an angle of the monitoring device rotating left. The length of the opening can be set according to an angle required by a user (e.g., 30 degrees).

The monitoring device 100 may comprise at least one lighting assembly 3, and the body 1 and the lighting assembly 3 may be connected in an integrated manner. In an example, the body 1 may comprise a first end face facing the lighting assembly 3, and the first end face may be provided with a limiter configured to limit the second position. The limiter may comprise a swing rod assembly and a second limiting groove 14. The swing rod assembly may be at least partially located in the second limiting groove 14, one end of the swing rod assembly may be rotatably connected to the first end face, and the other end of the swing rod assembly may be rotatably connected to the lighting assembly 3.

In an example, the second limiting groove 14 may have a first side wall and a second side wall, and the swing rod assembly may swing between the first side wall and the second side wall. In the first limit position, there may be a gap between the swing rod assembly and the first side wall, and in the second limit position, there may be a gap between the swing rod assembly and the second side wall.

A limit rotating shaft may be provided in the second limiting groove 14, one end of the swing rod assembly may be connected to the limit rotating shaft, and the other end may be connected to the lighting assembly 3. Alternatively, one end of the swing rod assembly may be sleeved on the rotating shaft, and the other end may be connected to the lighting assembly 3.

In an example, one of the first end face and the lighting assembly 3 may be provided with a rotating guide rail, and the other of the lighting assembly 3 and the first end face may be provided with a positioning convex rib, the positioning convex rib may fit in the rotating guide rail, and the limiter may be located in the rotating guide rail. In an example, the lighting assembly 3 may be provided with a stop structure, which is located at one end of the lighting assembly 3 facing the first end face, and may be disposed corresponding to the limiter to prevent the lighting assembly from moving.

The first end face may be provided with a limiter. The limiter may be configured to obstruct the movement of the lighting assembly 3 when the lighting assembly 3 rotates relative to the body 1. Without obstruction, the lighting assembly 3 may rotate at any angle, which causes inconvenience for angle adjustment. Therefore, the setting of the limiter can make the lighting assembly 3 rotate within a preset angle range.

The first end face may be provided with the second limiting groove 14 for accommodating the limiter, and the limiter may be disposed in the second limiting groove 14. The limiter may be swingable. The limiter may protrude from the second limiting groove 14, which can obstruct rotation of the lighting assembly 3 when the lighting assembly 3 rotates. In an example, the limiter may comprise the swing rod assembly 24.

A screw may be fixedly installed in the second limiting groove 14, and the first end of the swing rod assembly 24 may be sleeved on the screw and swings with the screw as the rotating shaft. When the lighting assembly 3 rotates clockwise and reaches the position of the swing rod assembly 24, the lighting assembly 3 may maintain inertia of continuous rotation, and thus may push the swing rod assembly 24 to swing to a left limit position. Similarly, when the lighting assembly 3 rotates counterclockwise and reaches the position of the swing rod assembly 24, the lighting assembly 3 may maintain inertia of continuous rotation, and thus may push the swing rod assembly 24 to swing to a right limit position.

In order to better obstruct the rotation of the lighting assembly 3, a second end face can be provided with a stop structure. The stop structure may be configured to be stopped by the limiter when the lighting assembly 3 rotates clockwise or counterclockwise, so as to prevent the movement of the lighting assembly 3. In a specific example, the stop structure may be a rib 25. When the lighting assembly 3 rotates clockwise or counterclockwise, the rib 25 may be stopped by the swing rod assembly 24, which prevents the movement of the lighting assembly 3. The rib 25 may be a block structure protruding from the second end face 6. When the lighting assembly 3 rotates clockwise, the rib 25 may contact with the swing rod assembly 24, and the swing rod assembly 24 may be pushed to the left limit position of the second limiting groove 14 under a thrust of the rib 25. When the lighting assembly 3 rotates counterclockwise, the swing rod assembly 24 may be pushed to the right limit position of the second limiting groove 14 under a thrust of the rib 25. In another example, when the swing rod assembly is located at the left limit position and the right limit position of the second limiting groove 14, the lighting device may be located at the second limit position.

Since the swing rod assembly 24 has a certain width, if the swing rod assembly 24 cannot swing in the second limiting groove 14 but is fixed in a certain position, an angle of the lighting assembly 3 when rotating must be less than 360 degrees. Therefore, in the technical solution of the present disclosure, in order to ensure that the rotation angle of the lighting assembly 3 reaches 360 degrees, the swing rod assembly 24 can swing in the second limiting groove 14. The present disclosure can ensure that the lighting assembly 3 can rotate 360 degrees. It is possible to adjust whether the swing rod assembly swings or not and the swing angle according to needs of the lighting range.

In an example, since the first end face is a circle and a shape of the second limiting groove 14 may be a sector concentric with the circle, the second limiting groove 14 can better adapt to the shape of the first end face and facilitates the swinging movement of the swing rod assembly 24. The monitoring device 100 may further comprise a waterproof wire passing mechanism.

Figure 8:
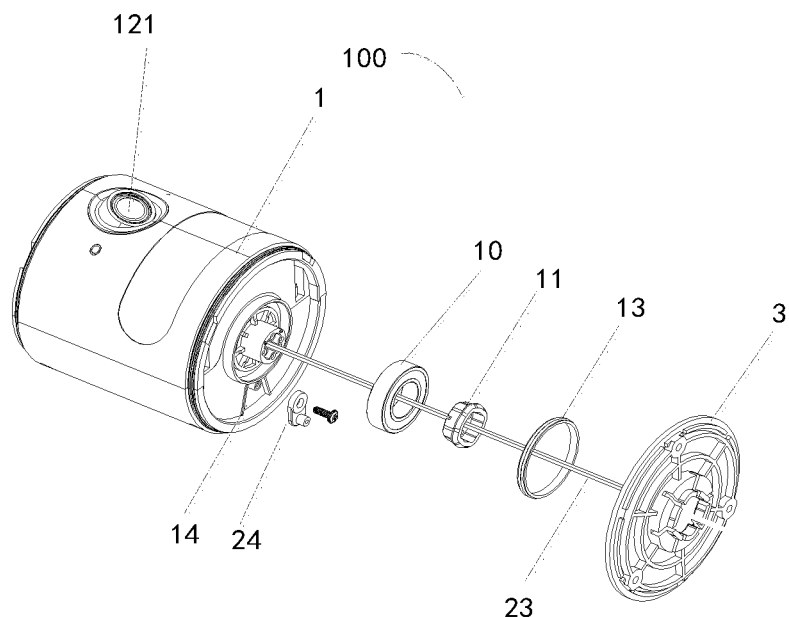
FIG. 8 shows a structural schematic diagram of the monitoring device.
Figure 9:
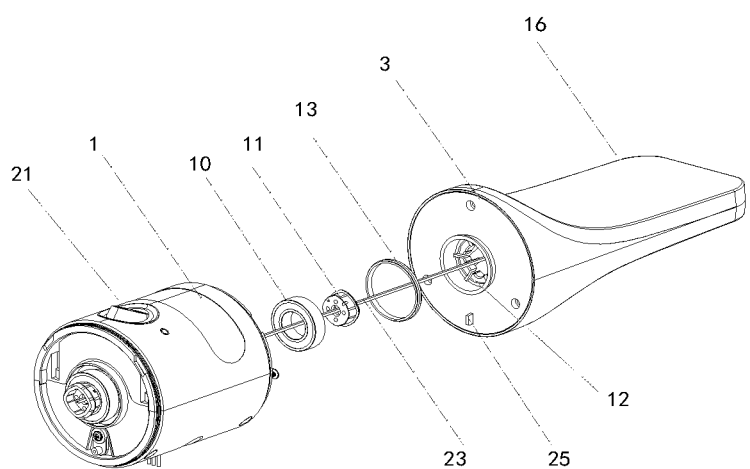
FIG. 9 shows a structural schematic diagram of the monitoring device from another viewing angle.

FIGS. 8 and 9 show schematic diagrams of the monitoring device 100. In order to clearly show a connection relationship between the body 1 and the lighting assembly 3, only part of the lighting assembly 3 is shown in the drawings. The waterproof wire passing mechanism may comprise a rotating mechanism and an annular connecting buckling position 11. The rotating mechanism may be located between the first end face of the body 1 facing the lighting assembly 3 and the connecting buckling position 11, one end of the connecting buckling position 11 may be fixedly installed on the first end face to fix the rotating mechanism on the first end face, and the other end of the connecting buckling position 11 may be connected to the second end face of the lighting assembly 3 facing the body 1 in a clamping manner. Both the rotating mechanism and the connecting buckling position 11 may be connected to the wire passing hole. The body 1 and the lighting assembly 3 may be connected in a plug-in way to realize quick assembly.

In an example, the body 1 and the lighting assembly 3 can be connected by a buckle 12 (e.g., a groove is disposed on the periphery of the connecting buckling position 11), and the lighting assembly 3 may be provided with the buckle 12 which can be inserted into the groove, so that the body 1 and the lighting assembly 3 may be connected by clamping. Since the material of the buckle 12 has elasticity, the buckle 12 can be inserted into the groove, so that the body 1 and the lighting assembly 3 can be quickly assembled.

Among them, the waterproof wire passing mechanism may also be provided with a waterproof part which comprises a waterproof sealing ring 13, the second end face may be provided with an annular protruding part surrounding the buckle 12, and the waterproof sealing ring 13 may be sleeved on the annular protruding part. In the waterproof wire passing structure, since the position of the buckle 12 may be a joint between the body 1 and the lighting assembly 3 which is prone to failure, the technical solution of the disclosure provides the waterproof sealing ring 13 here to improve waterproof performance of equipment. The waterproof sealing ring may be a waterproof silica gel ring.

Alternatively or additionally, the lighting assembly 3 may comprise at least one lighting lamp, each of which may be connected to an end face of the body 1. The lighting lamp may comprise a concave cambered surface part 19, and the concave direction of the cambered surface part 19 may be away from the camera 21, and the cambered surface part 19 may be located on a side of the lighting lamp close to the camera 21 to make a light path direction away from the position of the camera 21. The lighting lamp may further comprise a plane part connected to the cambered surface part 19, and the plane part may be located on a side of the lighting lamp away from the camera 21.

In an example, the lighting lamp may comprise: a first lighting lamp connected to a first end face of the body 1; and a second lighting lamp connected to a second end face of the body 1. The first end face may face away from the second end face, and the camera 21 may be located between the first lighting lamp and the second lighting lamp. A distance between the first lighting lamp and the camera 21 may be smaller than a distance between the second lighting lamp and the camera 21.

In an example, a housing 22 for shading may be provided around the camera 21, which may protrude outside the side where the camera 21 is located by a preset height. The housing 22 may have an opening configured to expose at least a lens of the camera 21.

The housing 22 may comprise a first side wall and a second side wall opposite to each other. The lens of the camera 21 may be tilted toward the second side wall, and a preset height of the first side wall may be higher than that of the second side wall.

Figure 10:
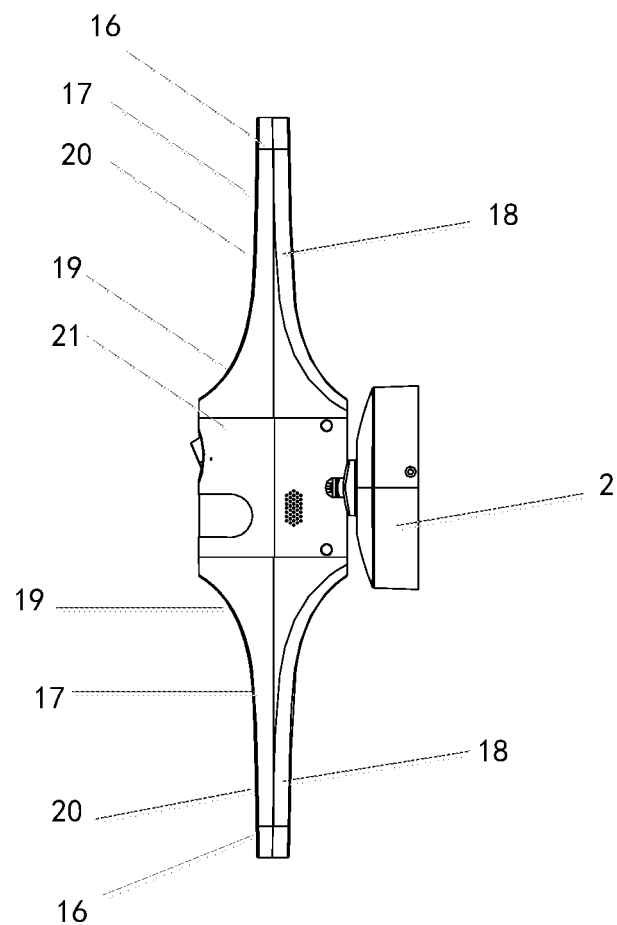
FIG. 10 shows a side view of the monitoring device.
Figure 11:
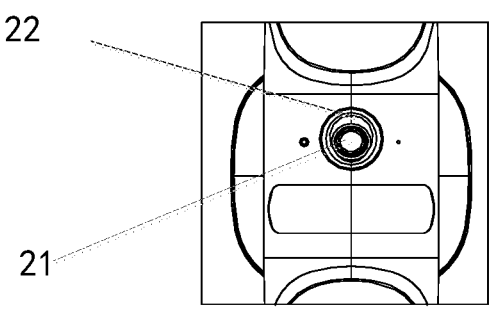
FIG. 11 shows an enlarged schematic diagram of the body of the monitoring device.

As shown in FIGS. 10 and 11, the lighting assembly 3 may comprise the lighting lamp 16. The lighting lamp 16 may comprise a light-emitting surface 17 and a bottom surface 18 away from each other, and the light-emitting surface 17 may comprise the concave cambered surface part 19 and a plane part 20. The cambered surface part 19 may be located on a side close to the body 1, and the plane part 20 may be located on a side away from the body 1. The highest position of the light-emitting surface 17 might not extend beyond the side of the body 1.

In an example, an end of the lighting lamp 16 connected to the body 1 may be a circle, and a diameter of the circle might not larger than a diameter of the cylinder, so that the whole monitoring device 100 has a high degree of integration and looks more beautiful.

Further, the lighting lamp 16 may comprise a first lighting lamp and a second lighting lamp, and the second lighting lamp may be located below the first lighting lamp. The body 1 may be located between the first lighting lamp and the second lighting lamp, and an end of the first lighting lamp connected to the body 1 may have a first preset distance from the camera 21. An end of the second lighting lamp connected to the body may have a second preset distance from the camera 21. The second preset distance may be larger than the first preset distance. The first preset distance and the second preset distance may refer to a distance between the side of the light-emitting surface close to the body 1 and the center of the camera 21. Since light emitted by the concave light-emitting surface may be tilted, a longer distance between the camera 21 and the lighting lamp 16 is better. However, considering appearance and installation space of the product, the lighting lamp 16 should not be too far from the camera 21. In an example, the first preset distance may be between 20 mm and 30 mm, for example, 25 mm, and the second preset distance may be between 40 mm and 60 mm, for example, 57 mm.

A camera 21 cambered disposed on the side of the body 1 and may be tilted to the ground along the vertical direction.

The housing 22 may be disposed around the camera 21 and may have a preset height. The distance between the first lighting lamp and the camera 21 may be short, which can further prevent the light emitted by the first lighting lamp from entering the camera 21. Moreover, the camera 21 may be tilted downward at a certain angle to obtain a good shooting effect. For example, the camera 21 can be tilted 10 degrees to 30 degrees to the ground (e.g., the camera may be tilted 23 degrees to obtain a better shooting effect). Meanwhile, since the camera 21 is tilted downward, it is easy for light of the second lighting lamp to enter the camera 21, so the second lighting lamp 16 may be away from the camera 21, and the second preset distance may be 57 mm. However, if the distance is too far, it might not only affect the beauty of the product, but will also affect a lighting effect, and lacks installation space. Therefore, for example, the second preset distance can be set within a range of more than 40 mm to less than 60 mm.

The lighting lamp 16 may comprise an LED module which has a good lighting effect and a long lifetime.

The present disclosure has at least the following advantages:

(1) The body of the monitoring device can rotate relative to the base, and the body is provided with a camera, so that a viewing angle of the camera increases and a monitoring range increases therewith. Moreover, since the body is integrally connected to the lighting lamp, when the body rotates relative to the base, the lighting lamp is also driven by the body to rotate relative to the base. When the monitoring range of the camera changes, the lighting lamp rotates in conjunction with the camera to light the environment. Furthermore, the lighting lamp can rotate relative to the body, so that a lighting angle is flexible and installation is convenient, which brings a user a better lighting and security experience.

(2) The body is connected to the lighting assembly by plugging, which solves the problem of complicated assembly in a traditional technology. A waterproof wire passing mechanism comprises a waterproof part, which can improve the waterproof performance of the monitoring camera device.

(3) A concave cambered surface part is provided on a side of the lighting lamp close to the camera to concentrate light emitted by the cambered surface part, which can prevent light from entering the camera to cause dazzling light or ghosting in an image shot by the camera.

Although the exemplary embodiments have been described here with reference to the drawings, it should be understood that the above exemplary embodiments are merely exemplary and are not intended to limit the scope of the present disclosure. Those of ordinary skill in the art can make various changes and modifications therein without departing from the scope and spirit of the present disclosure. All these changes and modifications are intended to be included within the scope of the present disclosure as claimed in the appended claims.

Those of ordinary skill in the art can realize that units and algorithm steps of each example described in combination with the embodiments disclosed herein can be implemented by electronic hardware or combination of computer software and electronic hardware. Whether these functions are implemented by hardware or software depends on specific application and design constraints of the technical solution. Those of ordinary skill in the art can use different methods to realize the described functions for each specific application, but the realization should not be considered beyond the scope of the present disclosure.

In several embodiments provided in the present disclosure, it should be understood that the disclosed device and method can be implemented in other ways. For example, the above-described embodiments of the device are only schematic, for example, division of the units is only logical function division, and there may be other ways of division in actual implementation, for example, a plurality of units or components can be combined or integrated into another device, or some features can be ignored or not executed.

Similarly, it should be understood that in order to simplify the disclosure and to help in understanding one or more of various aspects of the disclosure, in description of the exemplary embodiments of the disclosure, various features of the disclosure are sometimes grouped together into a single embodiment, figure, or description thereof. However, the method of the present disclosure should not be interpreted as reflecting the following intention that the claimed disclosure claims more features than those explicitly stated in each claim. More specifically, as reflected by corresponding claims, an invention point thereof lies in that a corresponding technical problem can be solved with features less than all the features of a disclosed single embodiment. Therefore, the claims that follow the detailed description are hereby expressly incorporated into the detailed description, with each claim itself as a single embodiment of the present disclosure.

It can be understood by those skilled in the art that all features disclosed in the specification (including accompanying claims, abstract and drawings) and all processes or units of any method or device thus disclosed can be combined in any combination, except that the features are mutually exclusive. Unless otherwise explicitly stated, each feature disclosed in the specification (including accompanying claims, abstract and drawings) may be replaced by alternative features that provide the same, equivalent or similar purpose.

In addition, those skilled in the art can understand that although some embodiments described herein include some features but not other features included in other embodiments, combination of features of different embodiments means that it is within the scope of the present disclosure and forms different embodiments. For example, in the claims, any one of the claimed embodiments can be used in any combination.

It should be noted that the above-described embodiments describe the disclosure rather than limit the disclosure, and those skilled in the art can design alternative embodiments without departing from the scope of the appended claims. In the claims, any reference numeral between parentheses shall not be construed as limitations on the claims. The disclosure can be realized by means of hardware comprising several different elements and by means of a suitably programmed computer. In unit claims enumerating several devices, several of these devices can be embodied by the same hardware. Use of the terms first, second, third, etc. does not indicate any order. These terms can be interpreted as names.

What is claimed is:

1. A monitoring device comprising:
   a base;
   a body rotatably connected to the base;
   a camera installed on the body; and
   a lighting device rotatably connected to the body and having a first limit position and a second limit position on a path of rotation of the lighting device relative to the body, wherein:
   a light-emitting surface of the lighting device in the first limit position faces at least a part of a shooting direction of the camera,
   the light-emitting surface of the lighting device in the second limit position faces away from the shooting direction of the camera, and
   the body comprises an end face facing the lighting device, and the end face is provided with a limiting device configured to limit the second limit position.

2. The monitoring device according to claim 1, wherein:
   the limiting device comprises a swing rod assembly and a limiting groove,
   the swing rod assembly is at least partially located in the limiting groove,
   a first end of the swing rod assembly is rotatably connected to the end face, and
   a second end of the swing rod assembly is rotatably connected to the lighting device.

3. The monitoring device according to claim 2, wherein:
   the limiting groove has a first side wall and a second side wall,
   the swing rod assembly is configured to swing between the first side wall and the second side wall,
   a first gap is formed between the swing rod assembly and the first side wall, and
   a second gap is formed between the swing rod assembly and the second side wall.

4. The monitoring device according to claim 2, wherein:
   the limiting groove is provided with a limiting rotating shaft,
   a first end of the swing rod assembly is connected to the limiting rotating shaft, and
   a second end of the swing rod assembly is connected to the lighting device.

5. The monitoring device according to claim 4, wherein:
   the first end of the swing rod assembly is sleeved on the limiting rotating shaft.

6. The monitoring device according to claim 1, wherein:
   one of the end face and the lighting device is provided with a rotating guide rail,
   the other one of the end face and the lighting device is provided with a positioning convex rib,
   the positioning convex rib fits in the rotating guide rail, and
   the limiting device is located in the rotating guide rail.

7. The monitoring device according to claim 1, wherein:
   the lighting device is provided with a stop structure, and
   the stop structure is located at one end of the lighting device facing the end face and is disposed corresponding to the limiting device to prevent the lighting device from moving.

8. The monitoring device according to claim 1, wherein:
   the lighting device comprises a lighting lamp connected to an end side of the body,
   the lighting lamp comprises a concave cambered surface,
   a concave direction of the concave cambered surface is away from the camera,
   the concave cambered surface is located on a side of the lighting lamp to make a light path direction away from the camera,
   the lighting lamp further comprises a plane connected to the concave cambered surface, and
   the plane is located on a side of the lighting lamp away from the camera.

9. The monitoring device according to claim 1, wherein the lighting device comprises:
a first lighting lamp connected to a first end side of the body; and
a second lighting lamp connected to a second end side of the body.

10. The monitoring device according to claim 1, wherein: the lighting device comprises: a first lighting lamp and a second lighting lamp,
the camera is located between the first lighting lamp and the second lighting lamp; and
a distance between the first lighting lamp and the camera is smaller than a distance between the second lighting lamp and the camera.

11. The monitoring device according to claim 9, further comprising:
a housing provided around the camera, wherein:
the housing protrudes outside a side where the camera is located by a preset height, and has an opening configured to expose a lens of the camera; and
the housing comprises a first side wall and a second side wall opposite to each other,
the lens of the camera is tilted toward the second side wall, and
a preset height of the first side wall is higher than a height of the second side wall.

12. The monitoring device according to claim 1, wherein the body is provided with a sealing ring, and the sealing ring and an inner wall of the body are enclosed to form an accommodating space.

13. The monitoring device according to claim 1, wherein the body is rotatable with respect to a direction perpendicular to an installation direction of the monitoring device.

14. A monitoring apparatus comprising:
a camera; and
a lighting device having a first limit position and a second limit position on a path of rotation of the lighting device, wherein:
a light-emitting surface of the lighting device in the first limit position faces at least a part of a shooting direction of the camera,
the light-emitting surface of the lighting device in the second limit position faces away from the shooting direction of the camera,
the lighting device comprises a first lighting lamp and a second lighting lamp, and
the camera is located between the first lighting lamp and the second lighting lamp.

15. The monitoring apparatus according to claim 14, further comprising:
a body, wherein the body comprises an end face facing the lighting device, and the end face is provided with a limiting device configured to limit the second limit position.

16. The monitoring apparatus according to claim 15, wherein:
the limiting device comprises a swing rod assembly and a limiting groove,
the swing rod assembly is at least partially located in the limiting groove.

17. The monitoring apparatus according to claim 14, wherein a distance between the first lighting lamp and the camera is smaller than a distance between the second lighting lamp and the camera.

18. A monitoring apparatus comprising:
a base;
a body having a camera, the body being rotatably connected to the base for relative movement about a first axis; and
a first lighting device and a second lighting device, the first and second lighting devices being rotatably connected to the body for relative movement about a second axis substantially perpendicular to the first axis, wherein:
the first lighting device comprises a lighting lamp connected to an end side of the body,
the lighting lamp comprises a concave cambered surface and a plane connected to the concave cambered surface, and
the plane is located on a side of the lighting lamp away from the camera.

19. The monitoring apparatus of claim 18, wherein:
a concave direction of the concave cambered surface is away from the camera, and
the concave cambered surface is located on a side of the lighting lamp to make a light path direction away from the camera.

20. The monitoring apparatus of claim 18, wherein a distance between the first lighting device and the camera is smaller than a distance between the second lighting device and the camera.

* * * * *